(12) United States Patent
Plottier et al.

(10) Patent No.: US 10,201,870 B2
(45) Date of Patent: Feb. 12, 2019

(54) ARC WELDING DEVICE WITH AUTOMATIC SELECTION OF THE METAL TRANSFER RATE

(71) Applicant: Air Liquide Welding France, Paris (FR)

(72) Inventors: Gérard Plottier, Ezanville (FR); Richard Chevalier, Pontoise (FR); Fabien Januard, Herblay (FR)

(73) Assignee: LINCOLN GLOBAL, INC., Santa Fa Springs, CA (US)

( * ) Notice: Subject to any disclaimer, the term of this patent is extended or adjusted under 35 U.S.C. 154(b) by 58 days.

(21) Appl. No.: 14/422,815

(22) PCT Filed: Jul. 22, 2013

(86) PCT No.: PCT/FR2013/051757
§ 371 (c)(1),
(2) Date: Feb. 20, 2015

(87) PCT Pub. No.: WO2014/037637
PCT Pub. Date: Mar. 13, 2014

(65) Prior Publication Data
US 2015/0190877 A1   Jul. 9, 2015

(51) Int. Cl.
*B23K 9/12* (2006.01)
*B23K 9/095* (2006.01)

(52) U.S. Cl.
CPC .............. *B23K 9/125* (2013.01); *B23K 9/095* (2013.01)

(58) Field of Classification Search
CPC ................................ B23K 9/095; B23K 9/125

USPC ...... 219/137 R, 137.7, 73, 74, 76, 130, 131, 219/137, 137.71, 130.1, 132, 137.2, 219/137.31, 130.21, 125.1, 130.01, 219/130.33; 117/205; 314/71, 75
See application file for complete search history.

(56) References Cited

U.S. PATENT DOCUMENTS 3,078,362 A * 2/1963 Steinert .................. B23K 9/125
                                                   219/130.4
3,125,671 A * 3/1964 Manz .................... B23K 9/0731
                                                   219/130.1
(Continued)

FOREIGN PATENT DOCUMENTS

| EP | 1 052 051 | 11/2010 |
| WO | WO 2008 151393 | 12/2008 |
| WO | WO 2011 157286 | 12/2011 |

OTHER PUBLICATIONS

Written Opinion for corresponding PCT/FR2013/051757, dated Nov. 13, 2013.

(Continued)

*Primary Examiner* — Dana Ross
*Assistant Examiner* — Ket D Dang (57) ABSTRACT

A device for arc welding with fusible wire including a device for setting the wire speed and a device for selecting a metal transfer rate type, the device for setting the wire speed being maneuverable by the hands or fingers of an operator. The device for selecting a metal transfer rate type cooperate with the device for setting the wire speed in such a way as to allow the operator to set the wire speed by maneuvering the device for setting the wire speed and to automatically select, on the basis of the wire speed setting, a metal transfer rate type.

6 Claims, 3 Drawing Sheets

(56) References Cited

U.S. PATENT DOCUMENTS

| | | | | |
|---|---|---|---|---|
| 3,129,352 A * | 4/1964 | Adamson | ................. | B23K 9/10 |
| | | | | 219/130.1 |
| 3,130,295 A * | 4/1964 | Manz | ..................... | B23K 9/125 |
| | | | | 219/130.1 |
| 3,627,978 A * | 12/1971 | Endo | ...................... | B23K 9/125 |
| | | | | 219/137 PS |
| 5,233,158 A * | 8/1993 | Karakama | ............ | B23K 9/0956 |
| | | | | 219/130.33 |
| 2005/0199602 A1* | 9/2005 | Kaddani | ............. | B23K 9/1062 |
| | | | | 219/130.21 |
| 2008/0142493 A1* | 6/2008 | Uecker | ................. | B23K 9/125 |
| | | | | 219/130.4 |
| 2010/0051596 A1* | 3/2010 | Diedrick | ............. | B23K 9/1336 |
| | | | | 219/137.2 |
| 2010/0314370 A1* | 12/2010 | Granato, Jr. | ........... | B23K 9/173 |
| | | | | 219/130.1 |
| 2011/0198329 A1* | 8/2011 | Davidson | ............... | B23K 9/095 |
| | | | | 219/130.5 |

OTHER PUBLICATIONS

French Search Report and Written opinion for corresponding FR 1258275, dated May 23, 2013.
International Search Report for corresponding PCT/FR2013/051757, dated Nov. 13, 2013.

* cited by examiner

ARC WELDING DEVICE WITH AUTOMATIC SELECTION OF THE METAL TRANSFER RATE

CROSS REFERENCE TO RELATED APPLICATIONS

This application is a 371 of International PCT Application No. PCT/FR2013/051757, filed Jul. 22, 2013, which claims priority to French Application No. 1258275, filed Sep. 5, 2012, the entire contents of which are incorporated herein by reference.

BACKGROUND

The invention relates to a device for arc welding with consumable metal wire allowing an operator to set the wire speed and automatically select, depending on the setting of the wire speed, a type of metal transfer regime. The invention also relates to a process for welding at least one metal part the performance of which is improved and the implementation of which is made easier by virtue of the device according to the invention.

Processes for arc welding with consumable metal wire under a gas flow, also called metal inert gas (MIG) or metal active gas (MAG) welding, rely on the use of an electric arc drawn between the end of a consumable metal wire, serving as a consumable electrode, and the metal parts to be welded. The heat of the electric arc allows both the constituent metal of the parts to be welded and the constituent metal of the consumable wire to be melted, thereby generating a weld bath formed from the molten constituent metal of the parts to be welded and of the metal of the melted consumable wire transferred in the electric arc toward the weld bath.

An arc welding process is generally carried out with a welding torch positioned facing the metal parts to be welded. The torch holds at its end the terminal portion of the consumable metal wire. The welding torch is also equipped with a nozzle distributing a flow of shielding gas over the weld bath in order to protect it from the surrounding atmosphere.

The torch is electrically connected to an arc welding unit, conventionally comprising at least one source of shielding gas supplying the torch, a current generator supplying the consumable wire with electrical current and a wire feeder allowing the wire to be fed out of the torch in the direction of the weld bath at a controlled wire speed.

An arc welding unit generally comprises means for selecting welding parameters, especially arc voltage, wire speed, i.e. the speed at which the wire is fed, smooth or pulsed current, etc.

The selected welding parameters result in a given type of metal transfer regime. More precisely, these parameters determine the welding energy, which determines the shape of the end of the wire when it is melted by the flow of current, and the way in which the constituent metal of the molten wire is transferred to the weld bath, i.e. the transfer regime.

At the present time, electric current generators, such as inverter and/or chopper generators, are widely employed in MIG or MAG welding because they allow arc current to be precisely controlled. In particular, they offer the possibility of imposing on the current particular waveforms as a function of time. It is then possible to control the detachment of the drop at the end of the wire, in order to work in a transfer regime suitable for the welding process to be implemented, for example in order to minimize projections of molten metal.

Typically, welding devices are equipped with electric generators in which the welding parameters, especially the magnitude of the current, i.e. the welding current, arc voltage and wire speed are programmed to vary together, and as a function of the wire speed, according to a preset relationship called a synergy. In general, these synergies are established beforehand by the manufacturer and memorized in the welding units.

Customarily, before a welding operation begins the operator selects a synergy suitable for the desired welding process, this process being defined by the type of material to be welded, the type of consumable wire, the type of gas, the type of the assembly or joint, the welding position, the type of metal transfer regime, etc. Once the synergy has been selected, the operator sets the wire speed and optionally sets the arc length. The current generator then automatically sets the welding parameters and the welding operation begins.

However, this operating mode is not entirely satisfactory.

Specifically, the type of metal transfer is selected at the welding unit when the initial synergy is chosen.

However, it is frequently the case that an operator welding an assembly with a given type of transfer regime will want to increase the feed speed of the wire, i.e. the rate at which the wire is melted, so as to increase productivity or deposition rate.

As wire speed, current and arc voltage are balanced, an increase in the wire speed implies an increase in current, which inevitably causes, above a certain wire speed, a change of transfer regime. The operator may thus be led to select involuntarily a transfer regime that is unsuitable for the welding process being carried out, for example a spray regime or a regime that is too energetic for the thickness to be welded or unwieldy in the desired welding position.

The operator is then obliged to select at the welding unit another synergy allowing him to obtain satisfactory results with the new wire speed setting. The ensuing adjustment operations are tedious and require a plurality of successive adjustment sequences and trial welds to be carried out.

SUMMARY

The problem to be solved is thus how to mitigate all or some of the aforementioned problems and in particular to provide a welding unit making it possible to greatly minimize or even eliminate the risk of an operator selecting a metal transfer regime unsuitable for the welding process that he wants to implement.

In other words, the present invention proposes to make it easier for an operator to set a welding unit to implement an arc welding process in a suitable metal transfer regime, no matter what the selected wire speed.

The solution of the invention is thus a device for arc welding with consumable metal wire comprising means for setting a wire speed Vf and means for selecting a type of metal transfer regime, the means for setting wire speed Vf being manually or digitally operatable by an operator, characterized in that the means for selecting a type of metal transfer regime interact with the means for setting the wire speed Vf so as to allow the operator to set the wire speed Vf by operating said means for setting wire speed Vf and so as to select automatically, depending on said setting of the wire speed Vf, a type of metal transfer regime.

Moreover, depending on the embodiment in question, the invention may comprise one or more of the following features:
- the type of metal transfer regime is selected from the group formed of at least a forced short-circuit transfer regime and an axial spray transfer regime.
- the welding device comprises memorizing means for memorizing at least one type of metal transfer regime selectable by the means for selecting a type of metal transfer regime.
- said memorizing means furthermore allow at least a first preset value of wire speed VfA and a second preset value of wire speed VfB to be memorized, the first value VfA being lower than the second value VfB.
- the welding device furthermore comprises means for comparing the wire speed Vf with said first and second preset values of wire speed VfA, VfB.
- the means for selecting the type of metal transfer regime interact with the comparing and memorizing means so that the operator automatically selects at least:
  - a first type of transfer regime when Vf is lower than or equal to the first preset value VfA; and
  - a second type of metal transfer regime when Vf is higher than or equal to the second preset value VfB.
- the first type of metal transfer regime is a forced short-circuit transfer regime and the second type of metal transfer regime is an axial spray transfer regime.
- the memorizing means interact with the means for selecting the first and/or second preset values VfA, VfB in order to allow, after selection, the values of said first and second preset values VfA, VfB to be automatically memorized.
- the first and/or second preset values VfA, VfB are chosen so that the difference between VfB and VfA corresponds to an incremental step of the means for setting the wire speed Vf.

According to another aspect, the invention also relates to a process for arc welding with consumable metal wire at least one metal part in which a device according to the invention is employed.

Preferably, the consumable metal wire is electrically connected to a device according to the invention and fed toward the metal part at a wire speed Vf. The consumable metal wire and at least one portion of the metal part to be welded are melted by means of an electric arc drawn between the end of the consumable wire and the metal part to be welded so as to transfer, in a given metal transfer regime, metal from the consumable wire to a weld bath, and, during the welding operation, a type of metal transfer regime is automatically selected by setting the wire speed Vf, said regime being selected from at least a forced short-circuit transfer regime and an axial spray transfer regime.

Advantageously, a type of metal transfer regime is automatically selected by setting the wire speed Vf, said regime being a forced short-circuit transfer regime when Vf is lower than or equal to the first value VfA of wire speed or an axial spray transfer regime when Vf is higher than or equal to the second value VfB of wire speed.

BRIEF DESCRIPTION OF THE DRAWINGS

The invention will now be better understood by virtue of the following detailed description given with reference to the appended figures, in which.

DESCRIPTION OF PREFERRED EMBODIMENTS

In general, with welding units employing electric generators, the operator sets the parameters of the process that he wants to implement depending on the assembly that he would like to produce. The parameters selected by the operator customarily comprise the type of material and the thickness of the part to be welded, the type of shielding gas, the wire diameter and type, and the type of metal transfer regime. Depending on the wire speed, the generator sets the arc voltage and the current type and waveform. A certain welding current results, conditional upon the wire speed.

The metal transfer regime is governed by the welding energy, which is defined by the arc voltage and current. This energy determines the shape of the end of the wire when it is melted by the flow of current, and the way in which the constituent metal of the molten wire is transferred to the weld bath.

Figure 1:
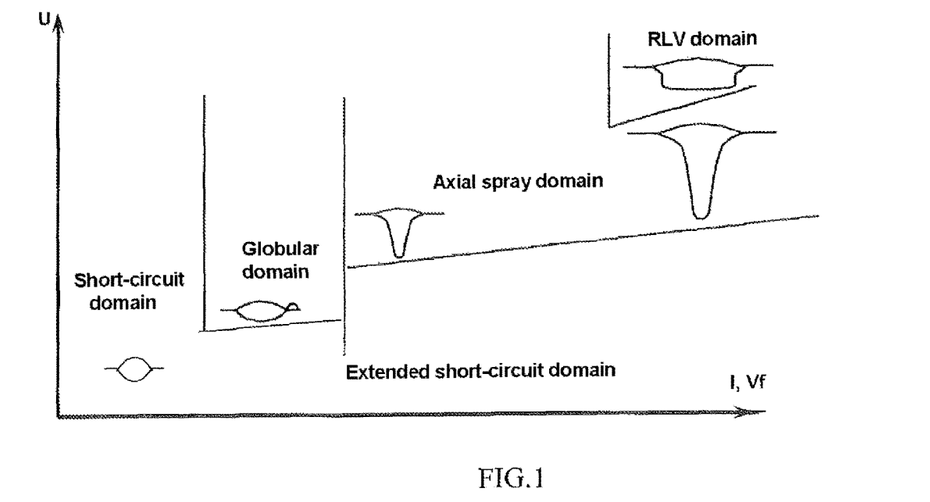
FIG. 1 depicts welding energy domains and the various corresponding types of metal transfer regime.

FIG. 1 depicts, as a function of arc voltage (U) and welding current (I) or wire speed (Vf), the various types of metal transfer regimes that may be encountered in arc welding.

In the context of the present invention, the following three types of conventional metal transfer regimes are of interest:

- the short-circuit or "short-arc" regime. This regime is obtained for low arc energies, typically from 50 to 200 A and from 15 to 22 V. A droplet of molten metal forms at the end of the filler wire and gradually increases in size until it makes contact with the weld bath, thus creating a short-circuit. The current then rapidly increases generating a pinch force that facilitates detachment of the droplet, then the arc reignites. This sequence repeats at frequencies of about 50 to 200 Hz. This regime is what is called a "cold" regime and requires a short arc. It is suitable for welding thin and medium thicknesses in a single pass, typically less than 5 mm, and allows the melt bath to be controlled during positional welding.
- the axial spray or "spray arc" regime. For high welding energies, i.e. at least 28 V for 280 A, and above a certain current density, typically higher than 250 A/mm$^2$ depending on the nature of the wire and the shielding gas, the end of the filler wire becomes an elongate cone shape. The molten metal is transferred from the wire to the weld bath in the form of fine droplets of molten metal the diameter of which is smaller than that of the wire and that are projected at high speed along the axis of the wire. The arc is 4 to 6 mm long. This transfer of metal ensures a stable arc and few projections. It enables deeper penetrations to be welded and large volumes of metal, typically corresponding to a wire speed of at least 15 m/min in the case of a soft or stainless steel wire of about 1 mm in diameter, to be deposited.
- the globular regime. For welding energies comprised between those leading to short-circuit and axial spray transfers, i.e. typically between 22 V for 200 A and 28 V for 280 A, the metal droplets that form on the end of the filler wire grow slowly. Since the current is not high enough to create a detaching pinch effect, the droplet becomes large, i.e. larger in size than the diameter of the wire in question. Transfer occurs either via a short-circuit, when the droplet touches the bath, or by detachment of the droplet under the effect of gravity. The droplet then follows a trajectory that is not always along the axis of the arc. This mode of transfer is unstable and gives rise to unsatisfactory welding results such as small welding penetrations and many metal droplet projections. It is in general sought to avoid arc welding in this regime.

These conventional metal transfer regimes succeed one another as welding energy increases, such as depicted in FIG. 1.

The particular bead morphologies obtained with these various transfer regimes are also illustrated in FIG. 1. In light of this, it will be understood that it is necessary to choose a transfer regime suitable for the process implemented and in particular for the type of assembly or joint to be welded. For example, spray metal transfer gives rise to a bead the penetration of which is more pronounced at the root, which is for example not suitable for welding parts the edges of which overlap each other.

As may be seen, there is between the short-circuit regime and the spray regime a domain of welding energies that is not accessible with conventional welding parameters because it leads to an unstable globular regime, which does not allow productivity to be increased under acceptable welding conditions.

In the context of the invention, what are called forced metal transfer regimes, which use unconventional welding parameters, are also of interest. These regimes rely on precise control of current waveforms.

In particular, the forced "short arc" or short-circuit regime (also called the "speed short arc" or "short arc-F" regime) allows the energy domain of short-circuit transfer to be extended and the drawbacks of the globular regime to be mitigated. In other words, it allows, with a welding energy normally located in the globular domain, short-circuit transfer to be maintained.

The forced short-circuit transfer regime consists of disassociated control of the current waveforms between the arc period and the short-circuit period. The current is made to increase exponentially in the short-circuit period, then decrease more rapidly at the start of the arc period. In this way, the welding energy is decreased with, at the end of the arc period, a return to short-circuit transfer before the metal droplet formed at the end of the filler wire has had time to increase in size.

Figure 2:
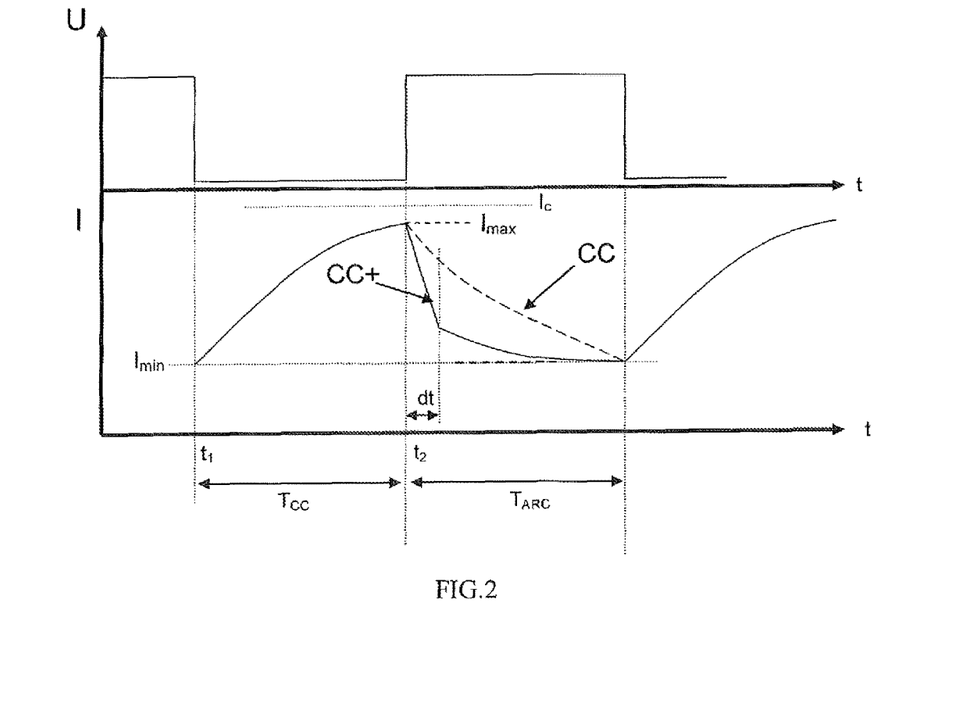
FIG. 2 depicts typical current waveforms for a short-circuit metal transfer regime and a forced short-circuit metal transfer regime.

FIG. 2 illustrates the current waveforms used in the case of an arc welding process in a short-circuit type transfer regime, or an extended short-circuit type transfer regime. The top part of FIG. 2 shows the variation in the arc voltage U over time, and the bottom part the variation in the arc current I over time.

In the conventional short-circuit regime (CC), the arc current increases in the short-circuit period $T_{CC}$ and decreases in the arc period $T_A$ according to a given waveform, defined by the inductance of the generator—preferably an electric generator.

In the forced short-circuit or short arc+regime (CC+), the current is made to decrease linearly and more rapidly at the start of the arc period, for a characteristic time dt, this being done in order to allow a peak current $I_c$ higher than the maximum conventional short-circuit current $I_{max}$ to be achieved while decreasing the energy of the arc period. In this way, formation and detachment of droplets is accelerated and the formation of large droplets the trajectory of which is uncontrollable is prevented. This makes it possible to extend the domain of the short-circuit regime by increasing the wire speed at which the transfer becomes globular, and to increase the productivity of the short-circuit regime under acceptable conditions. The domain corresponding to wire speeds at which the transfer is of forced short-circuit type instead of being globular as it would be in conventional welding is called the extended short-circuit domain in FIG. 1.

To these regimes must be added the unconventional rotating liquid vein regime. At very high welding energies, i.e. about 40 V for 450 A, the axial spray transfer is subject to substantial electromagnetic forces. Under the effect of these forces, the liquid metal in transit begins to turn, forming a rotating liquid vein.

In the context of the present invention, the welding energy domains corresponding to short-circuit, forced short-circuit, globular and axial spray transfer regimes in particular are of interest.

As explained above, before welding his assembly, the operator especially selects a metal transfer regime suitable for the process to be implemented.

However, the type of transfer selected is defined for a range of wire speeds. If the operator modifies the setting of the wire speed, he may be led to weld in an unsuitable metal transfer regime. In particular, in the short-circuit regime an increase in wire speed results in an increase in the average arc current and arc voltage, and therefore in an increase in welding energy. The reignition current is therefore correspondingly high, which implies, above a certain wire speed, passage into the globular domain before the axial spray domain is reached.

The present invention provides a welding unit that in particular makes it possible to greatly minimize or even completely eliminate the risk of an operator selecting a metal transfer regime unsuitable for the process that he wants to implement, especially a globular regime.

To do this, the solution of the present invention is based on the incorporation into a welding device of means for selecting the wire speed Vf and of means for selecting the type of metal transfer regime, the means for selecting the type of metal transfer regime interacting with the means for selecting wire speed.

Thus, the device of the invention allows an operator to set the wire speed Vf, thereby engendering, depending on the selected value, an automatic selection of a type of transfer regime, i.e. an automatic selection of a set of welding parameters, especially arc voltage, arc current and current waveforms during the short-circuit, leading to said transfer regime.

Preferably, whereas the means for selecting wire speed are manually or digitally operatable by the operator, the means for selecting the type of metal transfer regime are not directly actuatable by the operator. In other words, the means for selecting the type of transfer are actuatable by way of the means for selecting the wire speed Vf.

Advantageously, the type of metal transfer regime is selected from a group formed of at least a forced short-circuit transfer regime i.e. a "speed short arc" or "short arc-F" regime, and an axial spray transfer or "spray arc" regime.

Figure 3:
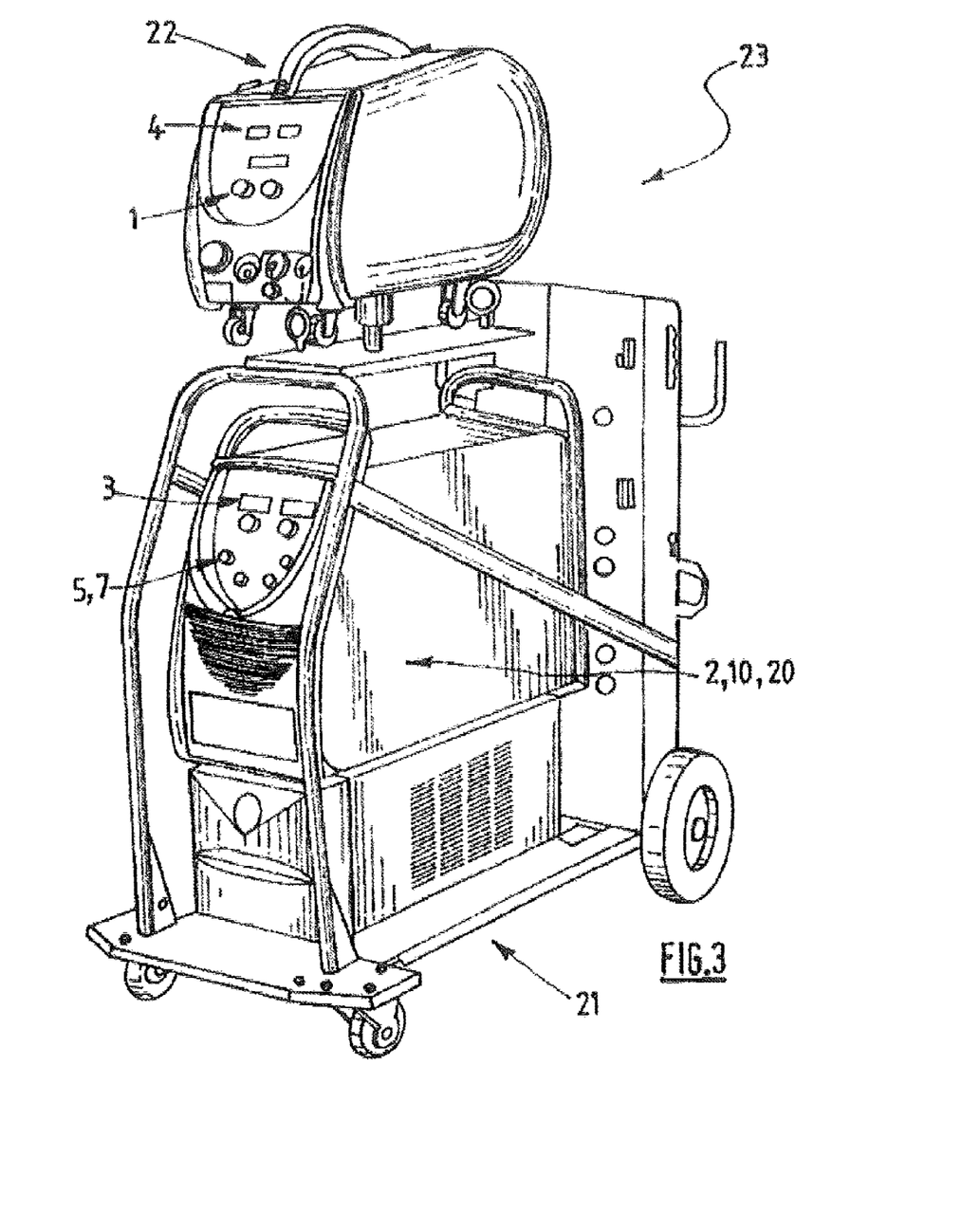
FIG. 3 illustrates one embodiment of the invention in which the device of the invention is a welding unit.

The device 23 comprises an external jacket and an internal structure.

FIG. 3 depicts a welding device 23 according to one embodiment of the invention, in which the device 23 is a welding unit.

FIG. 3 is shown for the sake of nonlimiting illustration of the present invention, the memorizing and selecting means described below possibly taking various forms with a view to fulfilling the same functions.

As may be seen, the device 23 of the invention preferably comprises at least one electric current generator 21 and a feeder 22 of consumable metal wire.

Preferably, the generator delivers an arc current of a magnitude ranging from 20 to 500 A and an arc voltage of about 10 to 40 V. Advantageously, the wire is fed at speeds ranging from 1 to 23 m/min.

The means 1 for setting the wire speed Vf may for example consist of at least one pressure-actuated button, at least one dial or equivalent. Preferably, the means for setting the wire speed are arranged on the external jacket of the device 23, preferably on the wire feeder 22. The means 1 for setting the wire speed Vf are preferably digital means, i.e. the speed is increased/decreased in increments.

Furthermore, the device 23 may comprise means for selecting arc length, preferably in increments, one increment being about 0.1 to 0.2 V.

According to the invention, the means 2 for selecting the type of metal transfer regime interact with the means 1 for setting the wire speed Vf so that, once the wire speed has been set by the operator, the welding device 23 automatically selects, depending on the setting of the wire speed Vf, a type of metal transfer regime.

To do this, the device 23 of the invention comprises means 10 for memorizing the types of transfer regimes selectable by the selecting means 2.

Preferably, the memorizing means 10 are incorporated in the internal structure of the welding device 23, preferably inside the current generator 21, such as depicted in FIG. 3.

The memorizing means 10 comprise a memory space, for example a space on a hard disk of the generator 21, in which a database containing a plurality of lookup tables indexing wire speed Vf and welding parameters is stored.

More precisely, these tables contain sets of welding parameters preferably comprising at least the arc voltage, arc current, arc length, or equivalently arc voltage, and the time constant that defines the rise time of the exponential variation that is imposed on the current. Each set corresponds to a value of wire speed Vf and defines an operating point.

In each of these tables, the variation in the values of these welding parameters is correlated to the wire speed Vf according to a preset relationship, or synergy, that changes depending on the value of wire speed Vf used. The look up or synergy tables thus contain a plurality of types of metal transfer regime.

The means 2 for selecting the type of transfer regime will in fact automatically lead the operator, when he selects the wire speed, to select a set of welding parameters from a given lookup table, these welding parameters having being defined beforehand in order to give rise to a type of metal transfer regime suitable for the process that the operator desires to implement.

A plurality of lookup tables indexing wire speed and welding parameters may be memorized for each welding configuration, i.e. a thickness of material to be welded, a type of wire, a type of gas, a type of joint, a welding position etc.

All the lookup tables contained in the database of the memorizing means 10 may for example be filled in following welding trials on various standard assemblies. For each welding configuration, the welding parameters giving the best welding results at the selected wire speed and the resulting type of transfer regime are memorized.

In order to implement the welding process in a suitable metal transfer regime and obtain satisfactory welding results whatever the selected wire speed Vf, the device 23 of the invention may comprise memorizing means 10 that furthermore allow at least a first preset value VfA of wire speed and a second preset value VfB of wire speed to be memorized and means 20 for comparing the selected wire speed Vf with said first and second values VfA, VfB.

In the case where the device of the invention is a welding unit, the memorizing 10 and comparing 20 means are preferably incorporated in the internal structure of the device 23, preferably in the internal structure of the generator 21.

In accordance with the invention, the means 2 for selecting the type of metal transfer regime interact with the comparing 20 and memorizing 10 means so that the operator automatically selects at least a first type of transfer regime when Vf is lower than or equal to the first value VfA (Vf≤fA), and a second type of metal transfer regime when Vf is higher than or equal to VfB (Vf≥fB).

In fact, a welding device according to the invention employs the following operating mode to set welding parameters. lo For a given welding configuration, each time the operator selects a wire speed Vf, this selection leads the comparing 20 and memorizing 10 means to be interrogated.

If Vf≤fA, the device 23 selects a set of welding parameters giving rise to a first transfer regime. The welding parameters vary in this range of wire speeds Vf≤fA according to a given relationship.

When the operator increases the speed Vf and once Vf≥fB, the device 23 automatically selects a set of welding parameters the variation of which is defined as a function of the speed Vf by another relationship. This gives rise to the selection, for Vf≥fB, of a second type of transfer regime different from the first type of transfer regime.

The preset values of wire speed may be memorized beforehand, i.e. be pre-recorded, in the internal structure of the device 23, for example during factory setup before delivery of the device.

Alternatively, the memorizing means 10 may interact with the means 7 for selecting at least first and second values of wire speed VfA, VfB, in order to allow, after selection by the operator himself, at least one wire speed value, especially at least one preset wire speed value among VfA and VfB to be automatically memorized. This is advantageous when, for the welding process carried out, the ranges of wire speed defining the first and second types of transfer regime overlap. Thus, the operator has a certain degree of freedom when choosing the speeds VfA and VfB between which the transition between the first and second types of regime and/or the third and first types of regime takes place. The selecting means 7 are advantageously arranged on the external jacket of the welding unit 23.

In the context of the present invention, the means 1 for setting the wire speed Vf are advantageously digital means. Digital setting means 1 thus allow the wire speed Vf to be increased/decreased incrementally in steps comprised between about 0.01 and 0.5 m/min and preferably about 0.1 m/min. Thus, in the case where the first type of transfer regime is an extended short-circuit regime and the second type of transfer regime is an axial spray regime, it is possible to pass to the first and to the second transfer type in one increment of wire speed, without passing via the globular regime.

Preferably, the feeding of welding wire by the feeder 22 is electronically regulated, thereby allowing the wire speed, one set, to be kept constant.

In the context of the present invention, the first type of transfer regime is advantageously a forced short-circuit regime, i.e. a short arc-F or speed short arc regime, and the second type of transfer regime is advantageously an axial spray regime, i.e. a spray arc regime. In this way, by judiciously choosing the first and second values VfA and VfB and a suitable wire speed increment, the operator can automatically pass from a forced short-circuit transfer regime to a spray transfer regime without running the risk of selecting a globular transfer regime.

The interaction of the means 1 for setting a wire speed, the means 2 for selecting the type of metal transfer and the comparing 20 and memorizing 10 means may be managed by an operating system, a software package, a computer program or equivalent incorporated into the internal structure of the device 23 and preferably into the internal structure of a generator 21.

Figure 4:
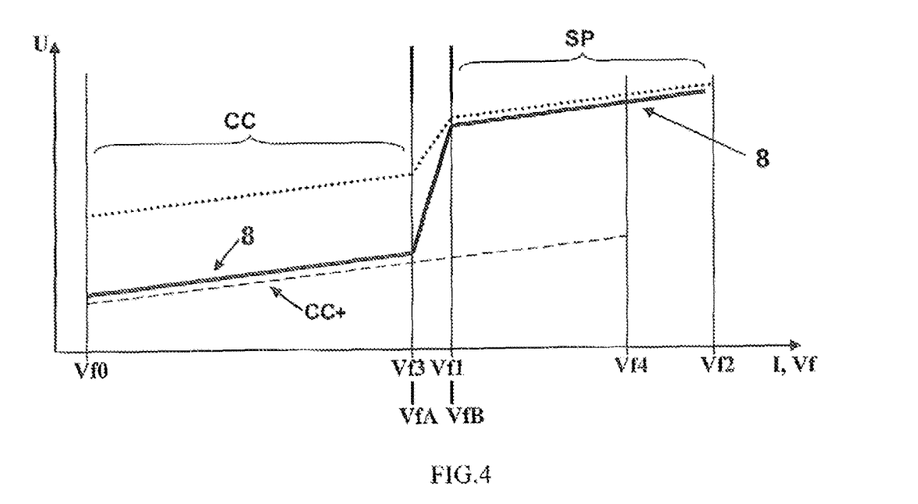
FIG. 4 depicts an automatic change of metal transfer regime according to one embodiment of the invention.
Figure 5:
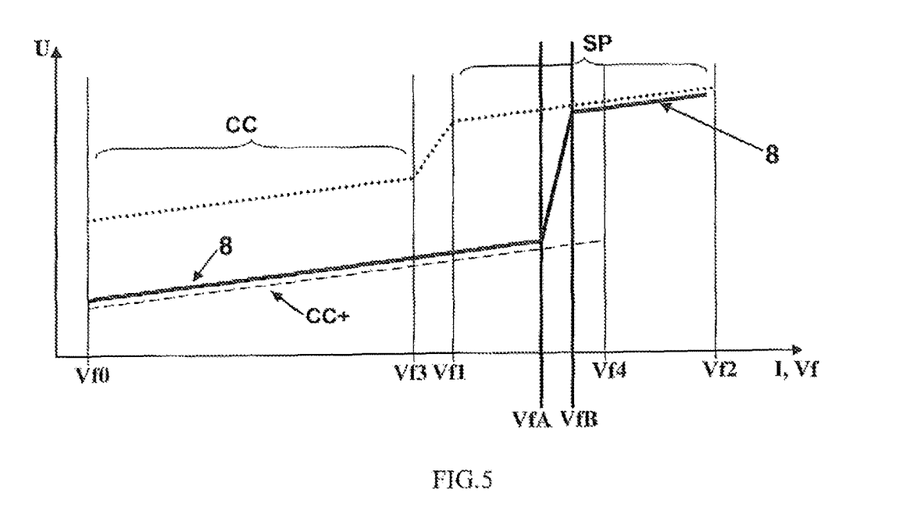
FIG. 5 depicts an automatic change of metal transfer regime according to another embodiment of the invention.

FIGS. 4 and 5 illustrate the variation of welding (or arc) voltage as a function of wire speed Vf in various embodiments of the present invention (solid line (———), also designated by the arrow 8), compared to welding processes in which the variation of the welding voltage results from use of devices not according to the invention.

The dotted line ( . . . ) thus depicts the variation of welding voltage without a device according to the invention during the use of conventional transfer regimes, i.e. without control of current waveforms. As may be seen, between the wire speeds Vf0 and Vf3 first a conventional short-circuit regime (CC) is encountered, then a globular regime between Vf3 and Vf1, and then an axial spray regime (SP). The axial spray domain extends between the wire speeds Vf1 and Vf2.

The dashed line (_ _ _) depicts the variation of the welding voltage obtained in a welding process using a forced short-circuit regime (CC+) such as described above. The forced short-circuit transfer domain extends from a wire speed Vf0 to a wire speed Vf4. The CC+ regime allows the domain of wire speeds at which the transfer is of the short-circuit type to be extended, thus allowing welding energies that customarily give rise to globular transfer to be used.

However, even with a forced short-circuit there is a maximum wire speed lo above which the regime becomes globular. Furthermore, the operator may need to increase the wire speed and use an axial spray regime. This is for example the case when it is desired to increase the volume of metal deposited and/or the penetration.

According to one particular embodiment of the invention, illustrated in FIG. 4 by line 8, the speed VfA is chosen so that it is equal to the maximum speed Vf3 at which conventional short-circuit transfer occurs, and the speed VfB is chosen so that it is equal to the minimum speed Vf1 at which axial spray transfer occurs. Preferably, at least the speeds VfB, VfA, Vf1 are pre-recorded in the device 23.

FIG. 5 depicts another embodiment of the invention in which the operator, by increasing the wire speed Vf, automatically ensures a transition between the forced short-circuit regime CC+ (up to VfA) and the axial spray regime SP (from VfB), the transition possibly occurring this time for different preset speed values, provided that VfA is higher than or equal to Vf0 and lower than or equal to Vf4 (Vf0≤VfA≤Vf4), and that VfB is higher than or equal to Vf1 and lower than or equal to Vf2 (Vf1≤VfB≤Vf2), VfA being lower than VfB.

In this embodiment, the memorizing means 10 preferably interact with the means 7 for selecting values of wire speed VfA, VfB. In this way, the operator may himself define the speeds at which he would like to see the transition occur. This is possible because, as FIG. 5 shows, the ranges of wire speed defining the forced short-circuit and axial spray domains overlap.

In the context of the present invention, the speeds VfA and VfB, and the increment of the wire speed are chosen so that a transition between the forced short-circuit regime CC+ (up to VfA) and the axial spray regime SP (from VfB) occurs automatically without passing via a globular regime. Advantageously, this transition occurs in one increment of wire speed, i.e. VfB is equal to VfA plus one increment of the means 1 for selecting wire speed.

Thus, it will be understood that one considerable advantage of the present invention is that it makes it possible to automatically select a metal transfer regime suitable for the welding process to be carried out. In particular, the device of the invention allows the operator to use a synergy combining operating points of forced short-circuit and axial spray regimes, the transition between these regimes possibly occurring without passing into a globular mode, at wire speeds VfA, VfB suitable for the process that the operator would like to implement i.e. for the welding configuration, especially the nature and thickness of the material to be welded, the type of wire used, the type of shielding gas, the type of joint, the welding position or the automatic or manual character of the process.

Advantageously, the welding device of the invention furthermore comprises means 5 for selecting at least one parameter defining the welding configuration, chosen from the type of metal to be welded, the thickness to be welded, the nature and/or diameter of the consumable filler wire, the type of shielding gas, the type of joint be welded, the welding position, the automatic and manual character of the process, etc. Preferably, the selecting means 5 are arranged on the external jacket of the device 23.

Optionally, at least one display means 3, 4, such as a screen or light associated with a written indication, is arranged on the external jacket of the device 23. At least one of the means for setting 1, selecting 2, 5, 7, memorizing 10 or comparing 20 interact with said display means 3, 4 so as to display one or more items of information chosen from at least the welding parameters, the wire speed, etc.

By way of example, tables 1 and 2 below illustrate sets of welding parameters corresponding to various values of wire speed Vf without the invention for a given welding configuration. Tables 3 and 4 illustrate sets of welding parameters corresponding to various values of wire speed Vf for the embodiments of the invention illustrated in FIGS. 4 and 5, respectively, the welding configuration being identical.

In all the above cases, a welding torch of a power of about 450 A supplied with current by a generator sold by AIR LIQUIDE WELDING under the trademark Digiwave 2 or Citowave 2 was used. The torch was equipped at its end with a consumable metal wire of 1.2 mm in diameter. The parts were welded at an angle in a flat position. The parts were made of soft steel, i.e. of carbon steel, that was 1 mm thick and were welded with a shielding gas sold by AIR LIQUIDE under the reference ARCAL 21, consisting of about 8% $CO_2$ and of argon for the remainder.

Tables 1 to 4 collate the main welding parameters with corresponding units, namely the time constant that defines the characteristic rise time of the exponential variation that is imposed on the current during the short-circuit period (cte cc), the average arc current (Imoy), the arc voltage (Uarc) and the average arc voltage (Umoy).

Table 1 illustrates the variation of these welding parameters as a function of wire speed in the case of a process carried out in a forced short-circuit regime. The latter extends from a speed Vf0 of 1 m/min to a speed Vf4 of 12 m/min.

Table 2 illustrates the variation of these welding parameters as a function of wire speed in the case of a process carried out in conventional short-circuit and axial spray transfer regimes. The short-circuit regime starts at a speed Vf0 of 1 m/min and extends up to a speed Vf3 of 6 m/min, and the axial spray regime extends from a speed Vf1 of 6.5 m/min to a speed Vf2 of 18 m/min.

Table 3 for its part illustrates the variation of these welding parameters as a function of wire speed in the case of a process carried out with a welding device according to the embodiment of the invention illustrated in FIG. 4. In this case, the first preset value of wire speed VfA is 6 m/min and the second preset value VfB is 6.5 m/min, which speed VfB corresponds to the speed Vf1 at which the axial spray regime starts.

Lastly, Table 4 illustrates the variation of these welding parameters as a function of wire speed in the case of a process carried out with a welding device according to the embodiment of the invention illustrated in FIG. 5. In this case, the first value VfA is 9 m/min and the second value VfB is 10 m/min.

TABLE 1

| Vf (m/min) | cte cc (ms) | Imoy (A) | Uarc (V) | Umoy (V) | Type of transfer |
|---|---|---|---|---|---|
| 1 | 7 | 55 | 14 | 13.4 | forced short-circuit |
| 1.5 | 7.3 | 80 | 15 | 13.4 | forced short-circuit |
| 2 | 7.3 | 100 | 16 | 14.4 | forced short-circuit |
| 3 | 7.3 | 144 | 17.4 | 15 | forced short-circuit |
| 3.5 | 7.3 | 156 | 18.4 | 15.6 | forced short-circuit |
| 5.5 | 3.5 | 220 | 19.6 | 17.6 | forced short-circuit |
| 6 | 3 | 237 | 20 | 18.2 | forced short-circuit |
| 7 | 3 | 250 | 21.4 | 19.4 | forced short-circuit |
| 8 | 2.5 | 270 | 22 | 20 | forced short-circuit |
| 9 | 1.6 | 300 | 23 | 21.2 | forced short-circuit |
| 12 | 1.6 | 390 | 30 | 28.2 | forced short-circuit |

TABLE 2

| Vf (m/min) | cte cc (ms) | Imoy (A) | Uarc (V) | Umoy (V) | Type of transfer |
|---|---|---|---|---|---|
| 1 | 14 | 56 | 14.4 | 13 | short-circuit |
| 1.5 | 14 | 76 | 15.4 | 14 | short-circuit |
| 2 | 14 | 102 | 16.4 | 14.6 | short-circuit |
| 2.5 | 14 | 120 | 17.6 | 15.6 | short-circuit |
| 3 | 14 | 146 | 19 | 16 | short-circuit |
| 4 | 12 | 188 | 19.8 | 16.6 | short-circuit |
| 5 | 10 | 200 | 20.6 | 17.6 | short-circuit |
| 6 | 10 | 220 | 22 | 19 | short-circuit |
| 6.5 | 10 | 250 | 24.8 | 24.2 | Axial spray |
| 7 | 10 | 260 | 25.8 | 25.2 | Axial spray |
| 10 | 10 | 330 | 27.4 | 26.8 | Axial spray |
| 12 | 10 | 400 | 29.8 | 29 | Axial spray |
| 15 | 10 | 445 | 32 | 31 | Axial spray |
| 18 | 10 | 480 | 34.6 | 33.4 | Axial spray |

TABLE 3

| Vf (m/min) | cte cc (ms) | Imoy (A) | Uarc (V) | Umoy (V) | Type of transfer |
|---|---|---|---|---|---|
| 1 | 7 | 55 | 14 | 13.4 | forced short-circuit |
| 1.5 | 7.3 | 80 | 15 | 13.4 | forced short-circuit |
| 2 | 7.3 | 100 | 16 | 14.4 | forced short-circuit |
| 3 | 7.3 | 144 | 17.4 | 15 | forced short-circuit |
| 3.5 | 7.3 | 156 | 18.4 | 15.6 | forced short-circuit |
| 5.5 | 3.5 | 220 | 19.6 | 17.6 | forced short-circuit |
| 6 | 3 | 237 | 20 | 18.2 | forced short-circuit |
| 6.5 | 3 | 250 | 24.8 | 24.2 | Axial spray |
| 7 | 3 | 280 | 25.8 | 25.2 | Axial spray |
| 10 | 3 | 330 | 27.4 | 26.8 | Axial spray |
| 12 | 3 | 400 | 29.8 | 29 | Axial spray |
| 15 | 3 | 445 | 32 | 31 | Axial spray |
| 18 | 3 | 480 | 34.6 | 33.4 | Axial spray |

TABLE 4

| Vf (m/min) | cte cc (ms) | Imoy (A) | Uarc (V) | Umoy (V) | Type of transfer |
|---|---|---|---|---|---|
| 1 | 7 | 55 | 14 | 13.4 | forced short-circuit |
| 1.5 | 7.3 | 80 | 15 | 13.4 | forced short-circuit |
| 2 | 7.3 | 100 | 16 | 14.4 | forced short-circuit |
| 3 | 7.3 | 144 | 17.4 | 15 | forced short-circuit |
| 3.5 | 7.3 | 156 | 18.4 | 15.6 | forced short-circuit |
| 5.5 | 3.5 | 220 | 19.6 | 17.6 | forced short-circuit |
| 6 | 3 | 237 | 20 | 18.2 | forced short-circuit |
| 7 | 3 | 250 | 21.4 | 19.4 | forced short-circuit |
| 8 | 2.5 | 270 | 22 | 20 | forced short-circuit |
| 9 | 1.6 | 300 | 23 | 21.2 | forced short-circuit |
| 10 | 3 | 330 | 27.4 | 26.8 | Axial spray |
| 12 | 3 | 400 | 29.8 | 29 | Axial spray |
| 15 | 3 | 445 | 32 | 31 | Axial spray |
| 18 | 3 | 480 | 34.6 | 33.4 | Axial spray |

According to another aspect, the invention also relates to a process for arc welding with consumable wire at least one metal part to be welded, employing a welding device according to the invention.

The metal part is welded by a moving the consumable metal wire relative to said part in a direction called the welding direction, this wire being electrically connected to a device according to the invention.

The wire is fed toward the metal part at a wire speed Vf and the consumable metal wire and at least one portion of the metal part to be welded are melted by means of an electric arc drawn between the end of the consumable wire and the metal part to be welded so as to transfer, in a given metal transfer regime, metal from the consumable wire to a weld bath. A weld bead is obtained by a gradual re-solidification of the weld bath and by moving the consumable wire and the metal part relative to each other.

Furthermore, a flow of inert gas is distributed over the weld bath by a nozzle with which the welding torch is equipped, said nozzle being positioned above the parts to be welded so as to protect the molten metal from ambient air.

Advantageously, the MIG or MAG electric arc is protected by a flow of gas mainly containing at least one inert compound chosen from helium and argon in an amount preferably of at least 80%, and optionally a minority compound having an oxidizing chemical character, chosen from carbon dioxide ($CO_2$) and dioxygen ($O_2$).

The invention makes it considerably easier for an operator to set up a welding unit and allows him to implement an arc welding process in a suitable metal transfer regime whatever the wire speed selected. During the welding operation, a type of metal transfer regime is automatically selected by setting the wire speed, said regime being selected from at least a forced short-circuit transfer regime and an axial spray transfer regime.

By virtue of the device of the invention, said transfer regime may be selected from a forced short-circuit transfer regime and an axial spray transfer regime, without passage into a globular regime. To do this, the first and second values of wire speed VfA and VfB are advantageously set so that the wire speed Vf changes between VfA and VfB in a single increment of the means 1 for setting said wire speed Vf, so that the transition between the forced short-circuit transfer regime and the axial spray transfer regime is direct.

The main application of the present invention is a process for welding metal parts, especially parts made of ferrous alloys, aluminum or an aluminum alloy and preferably of stainless steel or carbon steel.

It will be understood that many additional changes in the details, materials, steps and arrangement of parts, which have been herein described in order to explain the nature of the invention, may be made by those skilled in the art within the principle and scope of the invention as expressed in the appended claims.

Thus, the present invention is not intended to be limited to the specific embodiments in the examples given above.

The invention claimed is:

1. A device for arc welding with consumable metal wire, comprising a wire speed setting means and a selection means for selecting a first type of metal transfer regime or a second type of metal transfer regime, the wire speed setting means being manually or digitally operable by an operator, wherein the selection means interacts with the wire speed setting means to allow the operator to set a wire speed and to select automatically, depending on said setting of the wire speed, one of the first type and the second type of metal transfer regime,
   wherein the device further comprises a memory storing at least one operator adjustable preset wire speed value that sets a transition wire speed from the first type of metal transfer regime to the second type of metal transfer regime, wherein said at least one operator adjustable preset wire speed value includes a first preset wire speed value and a second preset wire speed value to be memorized, the first preset wire speed value being lower than the second preset wire speed value, and
   wherein the selection means interacts with the memory so that the operator automatically selects at least:
      the first type of metal transfer regime when the wire speed is lower than or equal to the first preset wire speed value; and
      the second type of metal transfer regime when the wire speed is higher than or equal to the second preset wire speed value.

2. The device of claim 1, wherein the first type of metal transfer regime is a forced short-circuit transfer regime and the second type of metal transfer regime is an axial spray transfer regime.

3. The device of claim 1, further comprising a comparison means for comparing an actual wire speed with said first preset wire speed value and second preset wire speed value.

4. The device of claim 1, wherein the at least one operator adjustable preset wire speed value that sets the transition wire speed from the first type of metal transfer regime to the second type of metal transfer regime further sets respective ranges of wire speeds corresponding to the first type of metal transfer regime and the second type of metal transfer regime.

5. The device of claim 4, wherein an adjustment of the at least one operator adjustable preset wire speed value that sets the transition wire speed from the first type of metal transfer regime to the second type further adjusts said respective ranges of wire speeds corresponding to the first type of metal transfer regime and the second type of metal transfer regime.

6. The device of claim 5, wherein the first type of metal transfer regime is a forced short-circuit transfer regime and the second type of metal transfer regime is an axial spray transfer regime.

* * * * *